(12) United States Patent
Rosthauser et al.

(10) Patent No.: US 6,641,762 B2
(45) Date of Patent: Nov. 4, 2003

(54) MIXED PMDI/SOLID NOVOLAC RESIN BINDERS FOR THE PRODUCTION OF WOOD COMPOSITE PRODUCTS

(75) Inventors: James W. Rosthauser, Pittsburgh, PA (US); H. Georg Schmelzer, Hilton Head Island, SC (US)

(73) Assignees: Bayer Corporation, Pittsburgh, PA (US); Borden Chemical Inc., Springfield, OR (US)

(*) Notice: Subject to any disclaimer, the term of this patent is extended or adjusted under 35 U.S.C. 154(b) by 429 days.

(21) Appl. No.: 09/794,976

(22) Filed: Feb. 27, 2001

(65) Prior Publication Data

US 2001/0006266 A1 Jul. 5, 2001

Related U.S. Application Data

(62) Division of application No. 09/213,955, filed on Dec. 17, 1998, now Pat. No. 6,294,117.

(51) Int. Cl.[7] .................................................. B27N 3/04
(52) U.S. Cl. ........................................ 264/109; 264/122
(58) Field of Search ................................ 264/109, 122, 264/124, 125, 126, 331.16, 331.22

(56) References Cited

U.S. PATENT DOCUMENTS

| | | | |
|---|---|---|---|
| 3,666,593 A | 5/1972 | Lee | 156/285 |
| 3,870,665 A | 3/1975 | Diehr et al. | 260/17.2 |
| 3,905,934 A | 9/1975 | Gardikes | 260/31.8 T |
| 4,100,328 A | 7/1978 | Gallagher | 428/407 |
| 4,209,433 A | 6/1980 | Hse | 260/29.3 |
| 4,293,480 A | 10/1981 | Martin et al. | 260/38 |
| 4,393,019 A | 7/1983 | Geimer | 264/83 |
| 4,517,147 A | 5/1985 | Taylor et al. | 264/83 |
| 4,546,039 A | 10/1985 | Horacek et al. | 428/357 |
| 4,602,069 A | 7/1986 | Dunnavant et al. | 525/504 |
| 4,609,513 A | 9/1986 | Israel | 264/122 |
| 4,617,223 A | 10/1986 | Hiscock et al. | 428/211 |
| 4,684,489 A | 8/1987 | Walter | 264/101 |
| 4,850,849 A | 7/1989 | Hsu | 425/407 |
| 4,944,823 A | 7/1990 | Stofko | 156/283 |
| 5,001,190 A | 3/1991 | Carpenter et al. | 524/871 |
| 5,002,713 A | 3/1991 | Palardy et al. | 264/109 |
| 5,008,359 A | 4/1991 | Hunter | 527/103 |
| 5,043,365 A | 8/1991 | Gardziella et al. | 523/143 |
| 5,101,001 A | 3/1992 | Henry et al. | 528/139 |
| 5,128,407 A | 7/1992 | Layton et al. | 524/839 |
| 5,140,086 A | 8/1992 | Hunter et al. | 527/103 |
| 5,143,768 A | 9/1992 | Wilderman et al. | 428/68 |
| 5,179,143 A | 1/1993 | König et al. | 524/35 |
| 5,204,176 A | 4/1993 | Seiss et al. | 428/304.4 |
| 5,332,458 A | 7/1994 | Wallick | 156/210 |
| 5,733,952 A | 3/1998 | Geoffrey | 523/143 |
| 5,744,079 A | 4/1998 | Kimura et al. | 264/109 |

FOREIGN PATENT DOCUMENTS

| | | |
|---|---|---|
| CA | 2043331 | 12/1991 |
| CA | 2081543 | 4/1993 |
| DE | 2724439 | 12/1978 |
| EP | 539807 | 5/1993 |
| EP | 712701 | 5/1996 |
| GB | 1387454 | 3/1975 |
| JP | 3-21321 | 1/1991 |
| WO | 88/03090 | 5/1988 |
| WO | 89/07626 | 8/1989 |

OTHER PUBLICATIONS

James B. Wilson's paper entitled, "Isocyanate Adhesives as Binders for Composition Board" which was presented at the symposium " Wood Adhesives–Research, Application and Needs" held in Madison, Wisconsin on Sep. 23–25, 1980.

*Primary Examiner*—Mary Lynn Theisen
(74) *Attorney, Agent, or Firm*—Joseph C. Gil; N. Denise Brown

(57) ABSTRACT

This invention relates to a process for the production of composite wood products. This process comprises a) applying a binder composition to wood particles, and b) molding or compressing the wood particles treated with the binder to form a composite wood product. Suitable binder compositions comprise a polymethylene poly(phenyl isocyanate) and a solid novolac resin.

12 Claims, No Drawings

MIXED PMDI/SOLID NOVOLAC RESIN BINDERS FOR THE PRODUCTION OF WOOD COMPOSITE PRODUCTS

RELATED APPLICATIONS

This application is a divisional application of U.S. application Ser. No. 09/213,955, now U.S. Pat. No. 6,294,117, which was filed on Dec. 17, 1998.

BACKGROUND OF THE INVENTION

This invention relates to a process for producing wood composite material by combining wood particles with a mixed polymethylene poly(phenylisocyanate)/solid novolac phenolic resin binder composition, followed by molding or compressing the combined wood particles and the binder composition.

Composite materials such as oriented stand board, particle board and flake board are generally produced by blending or spraying lignocellulose materials such as wood flakes, wood fibers, wood particles, wood wafers, strips or strands, pieces of wood or other comminuted lignocellulose materials with a binder composition while the materials are tumbled or agitated in a blender or like apparatus. After blending sufficiently to form a uniform mixture, the materials are formed into a loose mat, which is compressed between heated platens or plates to set the binder and bond the flakes, strands, strips, pieces, etc., together in densified form. Conventional processes are generally carried out at temperatures of from about 120 to 225° C. in the presence of varying amounts of steam generated by liberation of entrained moisture from the wood or lignocellulose materials. These processes also generally require that the moisture content of the lignocellulose material be between about 2 and about 20% by weight, before it is blended with the binder.

Plywood production is accomplished by roll coating, knife coating, curtain coating, or spraying a binder composition onto veneer surfaces. A plurality of veneers are then laid-up to form sheets of required thickness. The mats or sheets are then placed in a heated press and compressed to effect consolidation and curing of the materials into a board.

Binder compositions which have been used in making such composite wood products include phenol formaldehyde resins urea formaldehyde resins and isocyanates. See, for example, James B. Wilson's paper entitled, "Isocyanate Adhesives as Binders for Composition Board" which was presented at the symposium "Wood Adhesives—Research, Applications and Needs" held in Madison, Wis. on Sep. 23–25, 1980, in which the advantages and disadvantages of each of these different types of binders are discussed.

Isocyanate binders are commercially desirable because they have low water absorption, high adhesive and cohesive strength, flexibility in formulation, versatility with respect to cure temperature and rate, excellent structural properties, the ability to bond with lignocellulosic materials having high water contents, and no formaldehyde emissions. The disadvantages of isocyanates are difficulty in processing due to their high reactivity, adhesion to platens, lack of cold tack, high cost and the need for special storage. U.S. Pat. No. 3,870,665 and German Offenlegungsschrift No. 2,109,686 disclose the use of polyisocyanates (and catalysts therefor) in the manufacture of plywood, fiberboard, compression molded articles, as well as various technical advantages when used as binders.

It is known to treat cellulosic materials with polymethylene poly(phenyl isocyanates) ("polymeric MDI") to improve the strength of the product. Typically, such treatment involves applying the isocyanate to the material and allowing the isocyanate to cure, either by application of heat and pressure (see, e.g., U.S. Pat. Nos. 3,666,593, 5,008,359, 5,140,086, 5,143,768, and 5,204,176) or at room temperature (see, e.g., U.S. Pat. Nos. 4,617,223 and 5,332,458). While it is possible to allow the polymeric MDI to cure under ambient conditions, residual isocyanate groups remain on the treated products for weeks or even months in some instances. It is also known to utilize toluylene diisocyanate for such purposes.

Isocyanate prepolymers are among the preferred isocyanate materials which have been used in binder compositions to solve various processing problems, particularly adhesion to press platens and high reactivity. U.S. Pat. No. 4,100,328, for example, discloses isocyanate-terminated prepolymers which improve product release from a mold. U.S. Pat. No. 4,609,513 also discloses a process in which an isocyanate-terminated prepolymer binder is used to improve product release. A binder composition in which a particular type of isocyanate prepolymer is used to improve adhesiveness at room temperature is disclosed in U.S. Pat. No. 5,179,143.

A major processing difficulty encountered with isocyanate binders is the rapid reaction of the isocyanate with water present in the lignocellulosic material and any water present in the binder composition itself. One method for minimizing this difficulty is to use only lignocellulosic materials having a low moisture content (i.e., a moisture content of from about 3 to about 8%). This low moisture content is generally achieved by drying the cellulosic raw material to reduce the moisture content. Such drying is, however, expensive and has a significant effect upon the economics of the process. Use of materials having low moisture contents is also disadvantageous because panels made from the dried composite material tend to absorb moisture and swell when used in humid environments.

Another approach to resolving the moisture and isocyanate reactivity problem is disclosed in U.S. Pat. No. 4,546,039. In this disclosed process, lignocellulose-containing raw materials having a moisture content of up to 20% are coated with a prepolymer based on a diphenylmethane diisocyanate mixture. This prepolymer has a free isocyanate group content of about 15 to about 33.6% by weight and a viscosity of from 120 to 1000 mPa·s at 25° C. This prepolymer is prepared by reacting (1) about 0.05 to about 0.5 hydroxyl equivalents of a polyol having a functionality of from 2 to 8 and a molecular weight of from about 62 to about 2000 with (2) one equivalent of a polyisocyanate mixture containing (a) from 0 to about 50% by weight of polyphenyl polymethylene polyisocyanate and (b) about 50 to about 100% by weight isomer mixture of diphenylmethane diisocyanate containing 10 to 75% by weight of 2,4'-isomer and 25 to 90% by weight of 4,4'-isomer.

U.S. Pat. No. 5,002,713 discloses a method for compression molding articles from lignocellulosic materials having moisture contents of at least 15%, generally from 15 to 40%. In this disclosed method, a catalyst is applied to the lignocellulosic material. A water resistant binder is then applied to the lignocellulose with catalyst and the coated materials are then compression shaped at a temperature of less than 400° F. to form the desired composite article. The catalyst is a tertiary amine, an organometallic catalyst or a mixture thereof. The binder may be a hydrophobic isocyanate such as any of the polymeric diphenylmethane diisocyanates, m- and p-phenylene diisocyanates, chlorophenylene diisocyanates, toluene diisocyanates, toluene triisocyanates, triphenylmethane triisocyanates, diphenylether-2,4,4'-triisocyanate and polyphenol polyisocyanates. The catalyst is included to ensure that the isocyanate/water reaction is not slowed to such an extent that the pressing time necessary to produce the molded product is significantly increased.

Pressing of wafer board, oriented strand board, and parallel strand lumber using steam injection and a conventional binder such as a urea-formaldehyde resin or a polymeric diphenylmethane diisocyanate (MDI) is known. Examples of such known pressing processes are disclosed in U.S. Pat. Nos. 4,684,489; 4,393,019; 4,850,849; and 4,517,147. These processes yield a product having satisfactory physical properties if the binder is completely cured.

The completeness of binder cure may, of course, be determined by destructive testing of samples which have been permitted to cure for varying amounts of time under the process conditions. The cure time to be used during the production process is determined on the basis of the sample which had completely cured in the least amount of time. The disadvantages of this method are readily apparent. Valuable product is destroyed in the testing. Further, any variation in wood composition, extent of binder dispersion on the wood particles, etc. or processing conditions which would affect the rate of binder cure are not taken into consideration in the above-described method.

Binding compositions comprising urea extended polyisocyanates derived from a combination of a polyisocyanate and urea which is in solution with water, and the process for preparing the binding compositions is disclosed in U.S. Pat. No. 5,128,407. This reference also describes a process for preparing a composite material from comminuted particles or veneers of a lignocellulose material comprising coating the particles or veneers with these binding compositions.

A process for producing compression molded articles of lignocellulose type materials by use of an organic polyisocyanate compound as a binder is disclosed by U.S. Pat. No. 5,744,079. The binders comprise (A) an organic polyisocyanate such as, for example, MDI or PMDI, (B) an aqueous emulsion of a wax having a melting point ranging from 50° C. to 160° C., (C) an organic phosphate ester derivative, and (D) optionally, water.

It has been known that organic polyisocyanate resins have excellent adhesion properties and workability as the adhesive for thermo-compression molded articles such as particle boards and medium-quality fiber boards produced from a lignocellulose type material such as wood chips, wood fibers, and the articles exhibit excellent physical properties. However, the excellent adhesiveness of the organic polyisocyanate resins causes disadvantage that the compression molded article adheres firmly to the contacting metal surface of the heating plate in a continuous or batch thermo-compression process.

To solve the disadvantages of the undesired adhesion to the heating plate, it is required that a releasing agent is preliminarily sprayed onto the heating plate surface to form a releasing layer. Japanese Patent Publication No. 3-21321 discloses a method different from the external releasing agent spray, in which a mixture of an organic polyisocyanate and a mineral wax is sprayed onto the lignocellulose type material prior to thermo-compression molding. Japanese Patent laid open application No. 4-232004 discloses a method of thermo-compression molding of a lignocellulose type material by addition of a neutral ortho-phosphate ester as a compatibilizing agent, the wax and the polyisocyanate.

The large scale industrial manufacture of composite materials which are bonded exclusively with polyisocyanates have previously been limited. The use of some of the polyisocyanates, particularly the better performing isocyanates, such as polymethylene diisocyanate has been limited by their cost. Because of the cost constraints, the level of use of these expensive isocyanates is kept low for a given material. One approach to the use of levels of these isocyanates has involved chain extending the isocyanate with inexpensive extenders.

U.S. Pat. No. 4,944,823 describes a composition for bonding solid lignocellulosic materials. Suitable binder formulations are based on the reactive mixture of an isocyanate and a carbohydrate material. These are both effective and inexpensive, and eliminate health hazards associated with the use of formaldehyde. Carbohydrate materials include, for example, sugars and starches, in the presence or absence of other active materials. These carbohydrates are mixed with a liquid diisocyanate and applied to the wood, which is then pressed to form a composite product.

Binder compositions comprising phenolic resins and polyisocyanates are known and described in, for example, U.S. Pat. Nos. 3,905,934, 4,293,480, 4,602,069, 4,683,252, 5,001,190, 5,101,001 and 5,733,952, and WO 88/03090 and WO 89/07626. These binder compositions are disclosed as being suitable for foundry cores and molds. The materials are typically applied in an organic solvent and cured most often in the presence of gaseous amine vapors.

U.S. Pat. No. 3,905,934 discloses dialkyl phthalate ester solvent systems for phenolic resin-polyisocyanate binder systems. The phenolic resins are preferably benzylic ether resins, including novolac resins. These binder compositions are described as improving the ultimate tensile strength of the resultant foundry core products.

Phenolic resin and polyisocyanate binder systems containing a phosphorus component are set forth in U.S. Pat. Nos. 4,602,069 and 4,683,252. The binder compositions of U.S. Pat. No. 4,602,069 require a phosphorus based acid such as, for example, metaphosphoric, hypophosphoric, orthophosphoric, pyrophosphoric or polyphosphoric acid, or phosphorous, hydrophosphorous or pyrophosphorous acid or an organic derivative of these compounds, and optionally, an acid halide and/or a base. U.S. Pat. No. 4,683,252 describes binder comprising a phenolic resin, a polyisocyanate and an organohalophosphate. Novolacs and resoles are disclosed by both of these patents as suitable phenolic resins.

U.S. Pat. No. 5,001,190 and PCT application WO 88/03090 disclose a process for filling a space within a structure with a polyurethane composite in the presence of water. Suitable polyurethane composites comprise (a) adding a coarse aggregate to the space in the structure to be filled, (b) adding a polyurethane binder to the aggregate, wherein the binder comprises (i) a phenolic resin component comprising a resole phenolic resin and a hydrophobic solvent system, and (ii) a polyisocyanate component comprising an aromatic polyisocyanate and a hydrophobic solvent, and (iii) a urethane promoting catalyst.

Foundry binders based on phenolic resole resins and polyisocyanates are described in U.S. Pat. No. 5,101,001 and 5,733,952, and PCT application WO 89/07626. The compositions of U.S. Pat. No. 5,733,952 also comprise an epoxy resin and, preferably, paraffinic oil. Polymerized linseed oil is utilized in the binders of WP 89/07626.

Isocyanates are known to be suitable components for treating cellulosic fiber and wood products. Some processes for this treatment are described in, for example, U.S. Pat. Nos. 5,179,143 and 5,674,568. The binders of U.S. Pat. No. 5,179,143 comprise polyisocyanates, compounds containing at least two isocyanate reactive hydrogen atoms and alkylene carbonates. The binders for modified cellulosic products of U.S. Pat. No. 5,674,568 comprise a polymethylene poly(phenylisocyanate), water, and an organic compound having a hydroxy functionality of from 2 to 8 and a molecular weight of about 60 to 8000 and being selected from the group consisting of ester group-free polyhydric alcohols, polyether polyols and mixtures thereof.

Binders comprising polyisocyanates and phenolic resins are known and described as being suitable for preparing wood composite products by U.S. Pat. Nos. 4,209,433, 4,961,795, and 5,217,665. Suitable phenolic resins disclosed by these references are resole resins. U.S. Pat. No. 4,209,433 requires that the polyisocyanate be added to the wood particles prior to the application of the phenolic resin, thereby producing enhanced adhesive characteristics. The binder compositions of U.S. Pat. No. 4,961,795 may be cured with a curing agent comprising an ester, a lactone or an organic carbonate, which may be moderated by an aliphatic mono- or polyhydric alcohol.

A method of producing waferboard is described by U.S. 5,217,665. This method comprises applying first a liquid phenol formaldehyde resin to the surface of the wafers, then a powdered phenol formaldehyde resin. This is followed by forming layup and pressing at elevated temperature and pressure using steam pressing techniques to consolidate the layup into a board and to set the phenolic resin adhesive.

It is the purpose of this invention to make a mixed adhesive for wood composite manufacture that utilizes the strength of both the polyisocyanate and phenolic resins. These compositions do not contain organic solvents and do not require catalysts to cure. The curing temperatures are lower than that of the phenolic alone. Typically, novolac resins are cured by adding a compound which generates formaldehyde. The compositions of the present invention contain no formaldehyde. The water resistance of the composites is better than that of the phenolic alone. Less polyisocyanate can be used which results in a cost savings, and the tendency of the adhesives to stick to the platens is reduced.

SUMMARY OF THE INVENTION

This invention relates to a process for the production of wood composite materials comprising A) combining wood particles with a binder composition, and B) molding or compressing the combination of wood particles and binder composition formed in A). The compression or molding typically occurs at pressures of from about 200 to 1000 psi (preferably 300 to 700 psi) for about 2 to 10 (preferably 4 to 8) minutes at temperatures of from about 120° C. to 220° C. (preferably 150 to 200° C.). Suitable binder compositions to be combined with the wood particles in step A) consist essentially of:

(1) a polymethylene poly(phenylisocyanate) component having a functionality of about 2.1 to about 3.5, an NCO group content of about 25 to 33%, and a monomer content of from about 30% to about 90% by weight, wherein the content of the monomer comprises up to about 5% by weight of the 2,2'-isomer, from about 1% to about 20% by weight of the 2,4'-isomer, and from about 25% to about 65% by weight of the 4,4'-isomer, based on the entire weight of the polyisocyanate; and (2) a solid novolac resin.

In accordance with the present invention, wood particles are combined with from about 1 to 25% by weight, preferably from 2 to 10% by weight, most preferably with from 3 to 8% by weight of the binder compositions, based on the total weight of the wood composite. The weight ratio of component A)(2) the solid novolac resin to component A)(1) the polymethylene poly(phenylisocyanate) is from 2:1 to 10:1, preferably from 3:1 to 7:1.

When the binders are combined in this ratio, they typically do not flow as the novolac does not dissolve in the polyisocyanate. Also, they are not free flowing powders. Rather, these binders have the consistency of brown sugar.

DETAILED DESCRIPTION OF THE INVENTION

Polymeric MDI as used herein, refers to the three-ring and/or higher ring products derived by the phosgenation of aniline-formaldehyde condensation products.

Suitable polyisocyanates to be used as component 1) of the compositions in the present invention include (a) those polymethylene poly(phenylisocyanate) blends having an NCO group content of about 25% to 33% by weight, and having a viscosity of less than about 2,000 cps at 25° C. The polyisocyanates of the present invention have a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the blend. The polymeric MDI content of these isocyanates varies from about 10 to about 70% by weight, preferably from about 30% to about 60% by weight.

It is preferred that the polyisocyanates used as component (1) in the present invention have an average functionality of about 2.3 to about 3.0, most preferably of about 2.4 to about 2.8, and a monomer content of preferably 40 to 80%, most preferably of 40 to 70% by weight. The content of monomeric MDI preferably comprises less than 1% by weight of the 2,2'-isomer of MDI, less than 5% by weight of the 2,4'-isomer of MDI and from about 30 to about 60% by weight of the 4,4'-isomer of MDI, based on the entire weight of the polyisocyanate. Preferred polyisocyanates have viscosities of 10 to 1000 cps, more preferred polyisocyanates have viscosities of 40 to 400, and most preferred polyisocyanates have viscosities of 100 to 300 cps.

A preferred polymethylene poly(phenylisocyanate) blend has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the blend. This polyisocyanate blend comprises from about 20 to about 45% by weight of polymeric MDI.

Most preferred polyisocyanates include, for example, polymethylene poly(phenylisocyanate) blends having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the blend. This isocyanate blend comprises from about 50 to about 60% by weight of polymeric MDI.

Suitable polyisocyanates for component (1) of the present invention also include, for example, mixtures of polyisocyanate blends as described above with adducts of MDI including, for example, allophanates of MDI as described in, for example, U.S. Pat. Nos. 5,319,053, 5,319,054 and 5,440,003, the disclosures of which are herein incorporated by reference, and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Phenolic resins, obtained by the condensation of a phenolic compound with an aldehyde, are generally divided into two categories, the "novolac" resins and the "resole" resins or A-stage resins and their more highly polymerized derivatives, the "resitole" or B-stage resins. Novolac resins are permanently soluble, fusible resins in which the polymer chains have phenolic end-groups. They react to form crude to insoluble, infusible products upon the addition of a source of formaldehyde, such as hexamethylenetetraamine or paraform. Novolac resins have an excess of phenol. Resole and resitole resins are prepared generally using an alkaline catalyst with excess formaldehyde and result in polymers having pendant methylol groups. In the resitole stage, the resins are characterized by high viscosity. Since each methylol group constitutes a potential cross-linking site, the resole and resitole resins are readily converted to the cross-linked, infusible polymers by heating. Conversely, these resins are highly unstable.

Suitable solid novolac resins to be used as component (2) in the present invention include, for example, the phenolic resins in which the phenolic nuclei are joined by methylene bridges located at the ortho- and para-positions relative to the phenolic hydroxyl group. It is generally accepted that conventional acidic catalysts produce resins with a predominance of 4,4'- and 4,2'-linkages, although some 2,2'-linkages are also formed. Acid catalyzed resins have not been found fully acceptable where fast curing results are required as a result of the 4,4'- and 4,2'-linkages. Recently, novolac resins have been prepared which contain significant proportions of 2,2'-linkages using metal oxide or metal salt catalysts. This polymerization process is frequently referred to as an "ionic" polymerization. These ortho-resins cure faster and produce cross-linked phenolic resins of improved mechanical properties. Theoretically, the more ordered structure of the polymer molecule is obtained with 2,2'-linkages. The formation of phenolic resins of this type has, however, been limited to methods in which an excess of phenol is employed, which is necessary to prevent gelation of the resins during polymerization.

Suitable phenolic resins for the present invention compositions are (a) a mixture of dimethylol compounds having the formulas:

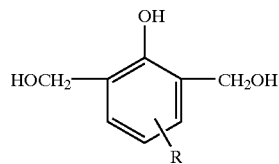
(i)

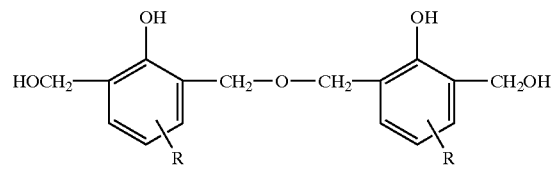
(ii)
and

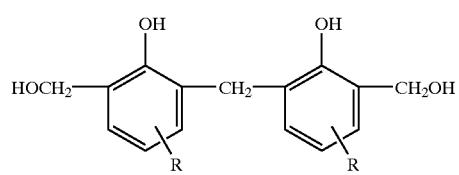
(iii)

wherein:
R: represents a hydrogen atom or a phenolic substituent meta to the phenolic hydroxyl group, said component (a)(iii) being a minor constituent in the mixture; and
(b) at least one compound corresponding to the formula:

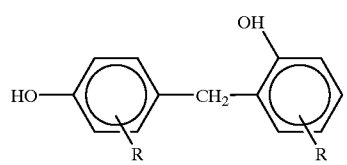
(i)

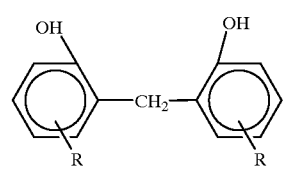
(ii)
and

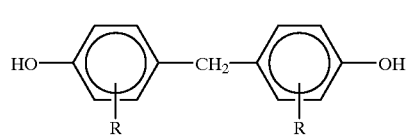
(iii)

wherein:
each R: independently represents a hydrogen atom or a phenolic substituent meta to the phenolic hydroxyl group; and
(c) higher molecular weight condensation products of said mixture having the general formula:

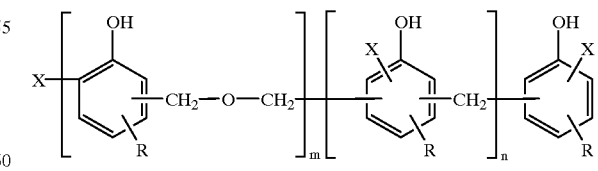

wherein:
R: represents a hydrogen atom or a phenolic substituent meta to the phenolic group;
X: represents an end group from the group consisting of hydrogen and methylol, wherein the molar ratio of methylol to hydrogen end groups is less than 1:1; and m and n: are each independently selected from a number between 0 and 20.

The phenolic compositions of the present invention as well as other highly valuable phenolic condensation products are prepared by a process which comprises reacting at temperatures below about 130° C. a phenol with an aldehyde under substantially anhydrous conditions in the liquid phase in the presence of a metal ion as the catalyst, the preferred metal ion being a divalent metal ion such as zinc, cadmium, manganese, copper, tin, magnesium, cobalt, lead, calcium and barium.

These solid novolac resins are typically prepared by the polymerization reaction of a suitable phenol group containing compound with an aldehyde, wherein a stoichiometric excess of the phenol group containing compound is present. Suitable phenolic components include nonyl phenol, as well as virtually any of the phenols which are not substituted at either the two ortho-positions or at one ortho and the parapositions. It is necessary that these positions be unsubstituted for the polymerization reaction with the aldehyde to occur. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions, substituted phenols employed in the formation of the novolac resins include, for example, alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include, for example, phenol, 2,6-xylenol, o-cresol, m-cresol, p-cresol, 3,5-xylenol, 3,4-xylenol, 2,3,4-trimethyl phenol, 3-ethyl phenol, 2,5-diethyl phenol, p-butyl phenol, 3,5-dibutyl phenol, p-amyl phenol, p-cyclohexyl phenol, p-octyl phenol 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the formula:

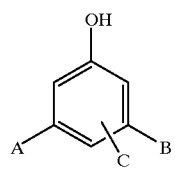

wherein:

A, B, and C: each independently represent hydrogen, hydroxyl radicals, hydrocarbon radicals, oxyhydrocarbon radicals or a halogen radical.

Also, suitable phenolic compounds are those compounds containing a second phenolic group such as, for example, catechol, resorcinol and hydroquinone.

The aldehydes reacted with the phenol can include any of the aldehydes theretofore employed in the formation of phenolic resins such as, for example, formaldehyde, acetaldehyde, propionaldehyde, furfuraldehyde, and benzaldehyde. In general, the aldehydes employed have the formula: R'CHO wherein R' is a hydrogen or a hydrocarbon radical of 1 to 8 carbon atoms. Formaldehyde is the most preferred aldehyde.

The novolac resins of the present invention are typically prepared by reacting a stoichiometric excess of the phenol group containing compound with a suitable aldehyde, thereby forming a solid novolac resin. Additional information relative to the preparation of the novolac resins can be found in, for example, Encyclopedia of Chemical Technology by Kirk Othmer, Fourth Edition, Volume 18, pp. 606–609.

Known catalysts for accelerating the isocyanate addition reaction may in principle be used in forming these binder compositions. The use of catalysts is not, however, necessary to the present invention. Suitable catalysts for this purpose include, for example, tin compounds such as dibutyl tin dilaurate or tin(II) octoate; and tertiary amines such as, for example, triethylene diamine, dimethylethyl amine, pyridine, 4-phenylpropyl pyridine, bis(N,N-dimethylaminoethyl) ether, N,N'-dimethylaminoethyl-N-methyl ethanolamine, N,N-dimethylaminoethyl morpholine, quinoline, morpholine, N-methyl morpholine, etc. Other catalysts are described in "Kunstoff Handbuch", Volume VII, published by Becker and Braun, Carl Hanser Vernag, Munich, 1983 on pages 92–98. The catalysts are used, if at all, in a quantity of about 0.001 to 10% by weight, preferably about 0.002 to 0.1% by weight, based on the total quantity of reactants.

Other optional additives and/or auxiliary agents which may be included in the binding compositions of the present invention include, for example, wax emulsions for reduced water absorption, preservatives, surface active additives, e.g., emulsifiers and stabilizers, mold release agents such as, for example, zinc stearate, etc. As stabilizing agents which reduce swelling and water absorption, there may be mentioned sodium chloride, sodium sulfate, paraffin, fatty acids or their salts such as zinc stearate and other similar materials. At the same time, paraffin and fatty acids and their salts may serve as release agents. Use of other active materials may shorten pressing and curing time.

As indicated above, the percentages of ingredients in the wood binder compositions according to the present invention can vary widely according to needs and conditions of a particular application. In general, however, quantities in the following ranges have been found suitable, bearing in mind that the other active materials may comprise one or more of the catalysts, stabilizing agents and release agents.

A preferred formulation for the composite products, such as particle board, comprises a blend of novolac resins, together with isocyanate (PMDI), with or without stabilizing agent, catalyst or release agent. The binder formulation for a particular product will depend upon wood species, requirements of physical properties of the resultant product, and pressing conditions, For example, a formulation range for Douglas fir commercial furnish requirements for interior particle board pressed at a press platten temperature of 350° F. for 4.4 minutes press time, to give a high quality commercial product is as follows:

| Components | Preferred range |
| --- | --- |
| Novolac Resin | 50–70% |
| PMDI | 5–35% |
| Stabilizer | 20–35% |
| Wax | 3–10% |

This binder formulation may be used in an amount of 1 to 25% by weight, expressed as a percentage of the total wood weight, or about 0.25 to 8.0% of PMDI based on the wood weight. Preferably, the quantity of binder formulation based on the weight of the wood is about 2 to 10%, depending on the configuration of the particulate wood and the requirements of the products. Also, if a small amount of isocyanate is used in the binder formulation (e.g., about 10 to 20% based on the total binder formulation, providing a relatively dry powder), then relatively greater proportions of binder formulation will be used (e.g., 8 to 10% binder formulation, or 1 to 2% isocyanate based on the wood weight). On the other hand, when relatively small quantities of binder formulation are used (e.g., 2 to 6% binder formulation) then the quantity of isocyanate in the powdery binder should be somewhat greater (e.g., 25 to 35%) to provide sufficient bonding, this provides a minimum percentage of isocyanate based on the quantity of wood of about 0.5 to 2%. In general, using a preferred powdery binder formulation, the maximum amount of isocyanate present will be about 20% based on the binder, or 2% based on the wood when 10% binder is used.

Although much less preferred, it is also possible to make liquid binder formulations according to the present invention using small quantities of inert, polar, non-aqueous solvent such as, for example, methylene chloride, or plasticizers such as, for example, butyl benzylphthalate or dioctyl phthalate, or solutions of novolac resins in inert, polar, non-aqueous solvents can also be used. Liquid binder formulations can have limited potlife. Care must also be exercised in minimizing the water content of these dissolved novolac resins because of the undesirable reaction between the isocyanate and the water prior to the wood bonding operation.

Liquid binder formulations according to the present invention can also be made by first mixing a relatively large quantity of dry novolac resin with a relatively small quantity of isocyanate, letting the mixture react to the point where free isocyanate is no longer present and then adding inert solvent or plasticizer to form a viscous mass. Thus, such a viscous mass can be obtained by first blending isocyanate with a novolac resin in the ratio of 10 to 50% by weight isocyanate and 50 to 90% by weight of powdered novolac, then letting the mixture react for 5 to 60 minutes, and finally adding 30 to 70%, based on the weight of the mixture, of inert solvent or plasticizer to obtain a viscous mass suitable for roller spreading on veneers in plywood manufacture. Viscosity can be controlled by adjusting the ratio of components in the mixture.

Binder formulations according to the present invention are made by blending together the various components in the proper sequence as noted above. When producing the preferred powdery binders, such blending preferably involves vigorous agitation for several minutes, such as in a suitable mill, in order to insure thorough blending of the isocyanate with the other components. It is preferable to blend together first the isocyanate with the stabilizing agent, catalyst and release agent (if one or more of these latter components are used) and then to add the novolac resin. Of course, the blending should be carried out for a time sufficient to produce a homogeneous blend, and under vigorous blending conditions, this will usually occur after several minutes of vigorous agitation.

The powdered binder formulations are applied to wood particles in the manufacture of particle board, wafer board, fiber board, etc., by intermixing a stream of wood particles with a stream of the powdered binder formulation at the desired ratio and using mechanical agitation which is in common usage in the manufacture of composite products such as particle board. When using powdered binders to make particle board or the like, the wood may have a wide range of moisture content, i.e., from about 0.5 to about 10% by weight, based on the total weight of the wood particles. However, it is advantageous if the moisture content of the wood particles is relatively low, i.e., on the order of about 1 to 6%, and after initial pressing and prior to final compacting in a hot press, the pre-formed particle board is sprayed with water to increase its moisture content to 10 to 11%.

Alternatively, although less preferred, binders can be added separately and subsequently blended together with the wood particles. This is less preferred because, at least in some cases, the two co-reactants are not intimately mixed in the proper ratios. As soon as the binder according to the invention comes into contact with wood, it starts reacting with the water contained in the wood.

The binder and resultant products are free of formaldehyde and the composite is produced at a cost competitive to the cost of making wood products using urea-formaldehyde resin which has the serious problem of formaldehyde emission. The binder formulation can also be applied to wood at higher moisture content which saves energy by reducing the degree of drying normally required prior to pressing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples of this invention:

| | |
|---|---|
| Isocyanate A: | polymethylene poly(phenyl isocyanate) blend having an NCO group content of 31.5% and a viscosity of about 200 mPa.s, commercially available from Bayer Corporation |
| Cascophen ® SD-838A: | a Novolac resin, commercially available from Borden Chemical, Inc. |
| Varcum ® 29-615: | a Novolac resin, commercially available from Occidental Chemical, Inc. (CAS Registry Number = 40216-08-8) |
| Stabilizer A: | sebacic acid |

The procedure used to prepare the boards containing the Cascophen and Varcum resins were the same, only differing in the amounts of each perspective resin (Novolac or Varcum) used in conjunction with the isocyanate. This procedure consisted of two parts, preparation of the binder, and preparation of the board.

Procedure for Preparation of Binder 200 parts by weight of Isocyanate A were combined with 100 parts by weight of Stabilizer A in a 32-oz. jar and mixed well. Then, 100 parts by weight of the solid resin (Novolac or Varcum) was ball-milled and screened using a #40 US-mesh sieve. This material was then placed in a separate container from the mixture of Isocyanate A and Stabilizer A (sebacic acid). The Isocyanate/Stabilizer mixture was added to the dried resin in the amounts shown in the Tables, and burundum cylinders were added to the 32-oz. jar. The jar was then rolled on a roller table for 1 to 1½ hours. The container was periodically opened and material clinging to the container walls was scraped off. The binder mix was then sieved once more through a #40 US-mesh sieve and placed in a catch pan. The catch pan containing the binder was placed in a dessicator for 3 to 4 hours.

Procedure for Preparation of Boards

According to the amounts shown in the Tables, particleboard furnish was placed in a stainless steel bowl (for use in a KitchenAid KSM90 mixer). The binder mixture, now semi-dried, was added in 5 to 10 g increments, and the furnish was mixed by hand initially to promote uniform dispersion of the binder to the furnish. The stainless bowl was transferred to the KitchenAid mixer and mixed at lowest speed for 5 minutes. The resin-coated furnish was then placed in an eight inch by eight inch form and pre-pressed by hand. The form was then placed in a Carver Press (Model M), and pressed at 350° F. for four and one half minutes.

The resultant boards were tested for Internal Bond Strength and Thickness Swell in accordance with ASTM method D1037: Evaluating Properties of Wood-Base Fiber and Particle Panel Materials. The results are set forth in Tables 1 through 3 below.

TABLE 1

| Example | 1 | 2 |
|---|---|---|
| Percent of each resin based on total weight of composite board | 7:1 Varcum 29-615/ Isocyanate A | 7:1 Varcum 29-615/ Isocyanate A |
| Percent Wood* | 91.5% | 91.5% |
| Percent Sebacic Acid | 0.5% | 0.5% |
| Curing Temperature (° F.) | 350 | 400 |
| Average Density (pcf) | 56.32 | 53.09 |
| Internal Bond Strength (psi) | 190 | 144 |
| Thickness Swell (%) | 17.7 | 16.1 |

*Weight of wood, excluding moisture.

TABLE 2

| Example | 3 | 4 |
|---|---|---|
| Percent of each resin based on total weight of composite board | 7:1 Cascophen SD-838A/ Isocyanate A | 7:1 Cascophen SD-838A/ Isocyanate A |
| Percent Wood* | 91.5% | 91.5% |
| Percent Stabilizer | 0.5% | 0.5% |
| Curing Temperature (° F.) | 350 | 400 |
| Average Density (pcf) | 52.87 | 52.16 |
| Internal Bond Strength (psi) | 213 | 189 |
| Thickness Swell (%) | 17.3 | 19.1 |

*Weight of wood, excluding moisture

TABLE 3

| Example | 5 | 6 |
|---|---|---|
| Percent of each resin based on total weight of composite board | 6:2 Cascophen SD-838A/ Isocyanate A | 7:1 Cascophen SD-838A/ Isocyanate A |
| Percent Wood* | 91% | 91.5% |
| Percent Stabilizer | 1.0% | 0.5% |
| Curing Temperature (° F.) | 400 | 400 |
| Average Density (pcf) | 52.45 | 51.14 |
| Internal Bond Strength (PSI) | 242 | 179 |
| Thickness Swell (%) | 12.5 | 30.2 |

*Weight of wood, excluding moisture

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of wood composite materials comprising:
   A) combining wood particles with (1) a polymethylene poly(phenylisocyanate) having a functionality of about 2.1 to about 3.5, and NCO group content of from about 25 to 33%, and a monomer content of from about 30% to 90% by weight, wherein the content of the monomer comprises up to about 5% by weight of the 2,2'-isomer, from about 1% up to about 20% by weight of the 2,4'-isomer, and from about 25% to about 65% by weight of the 4,4'-isomer, based on the entire weight of the polyisocyanate;
   B) coating the combination formed in A) with (2) a solid novolac resin; and
   C) molding or compressing the coated combination formed in B);
   wherein components (1) and (2) are present in amounts such that there is from 1 to 25% by weight, based on the total weight of the wood composite, of components (1) and (2), and the weight ratio of component (2) to component (1) is from 1:3 to 10:1.

2. The process of claim 1, wherein components (1) and (2) are present in amounts such that there is from 2 to 10% by weight, based on the total weight of the wood composite, of components (1) and (2).

3. The process of claim 1, wherein components (1) and (2) are present in amounts such that there is from 3 to 8% by weight, based on the total weight of the wood composite, of components (1) and (2).

4. The process of claim 1, wherein the weight ratio of component A)(2) to component A)(1) is from 3:1 to 7:1.

5. The process of claim 1, wherein component A)(1) said polymethylene poly(phenylisocyanate) has a viscosity of less than about 2,000 cps at 25° C.

6. The process of claim 1, wherein component A)(1) said polymethylene poly(phenylisocyanate) has a functionality of about 2.3 to 3.0, an NCO group content of about 30 to 33%, and a monomer content of about 40 to 70%.

7. A process for the production of wood composite materials comprising:
   A) combining wood particles with (2) a solid novolac resin;
   B) coating the combination formed in A) with (1) a polymethylene poly(phenylisocyanate) having a functionality of about 2.1 to about 3.5, and NCO group content of from about 25 to 33%, and a monomer content of from about 30% to 90% by weight, wherein the content of the monomer comprises up to about 5% by weight of the 2,2'-isomer, from about 1% up to about 20% by weight of the 2,4'-isomer, and from about 25% to about 65% by weight of the 4,4'-isomer, based on the entire weight of the polyisocyanate; and
   C) molding or compressing the coated combination formed in B);
   wherein components (1) and (2) are present in amounts such that there is from 1 to 25% by weight, based on the total weight of the wood composite, of components (1) and (2), and the weight ratio of component (2) to component (1) is from 1:3 to 10:1.

8. The process of claim 7, wherein components (1) and (2) are present in amounts such that there is from 2 to 10% by weight, based on the total weight of the wood composite, of components (1) and (2).

9. The process of claim 7, wherein components (1) and (2) are present in amounts such that there is from 3 to 8% by weight, based on the total weight of the wood composite, of components (1) and (2).

10. The process of claim 7, wherein the weight ratio of component A)(2) to component A)(1) is from 3:1 to 7:1.

11. The process of claim 7, wherein component A)(1) said polymethylene poly(phenylisocyanate) has a viscosity of less than about 2,000 cps at 25° C.

12. The process of claim 7, wherein component A)(1) said polymethylene poly(phenylisocyanate) has a functionality of about 2.3 to 3.0, an NCO group content of about 30 to 33%, and a monomer content of about 40 to 70%.

\* \* \* \* \*